(12) United States Patent
Roston et al.

(10) Patent No.: US 10,493,390 B2
(45) Date of Patent: Dec. 3, 2019

(54) AIR OR GAS CLEANING BLOWER WITH SPIRAL SEPARATION CHAMBER

(71) Applicant: ANDOVER PROTECTION SYSTEMS, LLC, Stephentown, NY (US)

(72) Inventors: Edward Roston, Brooklyn, NY (US); Matthew A. Palmer, Bronx, NY (US)

(73) Assignee: ANDOVER PROTECTION SYSTEMS, LLC, Stephentown, NY (US)

( * ) Notice: Subject to any disclaimer, the term of this patent is extended or adjusted under 35 U.S.C. 154(b) by 182 days.

(21) Appl. No.: 15/616,092

(22) Filed: Jun. 7, 2017

(65) Prior Publication Data

US 2018/0078890 A1    Mar. 22, 2018

Related U.S. Application Data (60) Provisional application No. 62/395,450, filed on Sep. 22, 2016.

(51) Int. Cl.
   *B01D 45/14*      (2006.01)
   *B01D 45/16*      (2006.01)
   (Continued)

(52) U.S. Cl.
   CPC ............. *B01D 45/16* (2013.01); *B01D 45/14* (2013.01); *F04D 29/4226* (2013.01); *F04D 29/706* (2013.01); *F24F 3/1603* (2013.01)

(58) Field of Classification Search
   CPC ......... B01D 45/12; B01D 45/14; B01D 45/16
   (Continued)

(56) References Cited

U.S. PATENT DOCUMENTS

| 1,785,918 A | 12/1930 | Stebbins |
| 2,209,607 A | 7/1940 | Nutting |

(Continued)

FOREIGN PATENT DOCUMENTS

| DE | 102008012402 | 9/2009 |
| EP | 1204450 B1 | 4/2005 |
| WO | WO9740915 | 11/1997 |

OTHER PUBLICATIONS

International Search Report and Written Opinion for PCT/US2014/064660, dated Feb. 23, 2015, 13 pages.

(Continued)

*Primary Examiner* — Robert A Hopkins
(74) *Attorney, Agent, or Firm* — Ansari Katiraei LLP; Arman Katiraei; Sadiq Ansari (57) ABSTRACT

Provided is an air or gas cleaning blower with a spiral separation chamber. An impeller draws in particulate-pervaded air or gas and imposes a centrifugal force that accelerates the particulate-pervaded air or gas outwards in the chamber. The particulates, because of their heavier mass relative to the air or gas, accumulate against the outer chamber wall. Most of the lighter air or gas is unable to penetrate through the layer of particulates and is trapped in between the particulates about the outer wall and the inner wall of the chamber. The impeller pushes the separated particulates and cleaned air or gas further down the chamber with the particulates ejecting out a first outlet about the outer chamber wall and the cleaned air or gas circulating around the first outlet, moving further down the chamber, and ejecting out a second outlet.

20 Claims, 11 Drawing Sheets

(51) Int. Cl.
  *F04D 29/42* (2006.01)
  *F24F 3/16* (2006.01)
  *F04D 29/70* (2006.01)

(58) Field of Classification Search
  USPC .................................................. 55/400, 471
  See application file for complete search history.

(56) References Cited

U.S. PATENT DOCUMENTS

| | | | |
|---|---|---|---|
| 2,327,886 A * | 8/1943 | Haber | ..................... F22B 37/26 |
| | | | 55/338 |
| 2,593,294 A | 4/1952 | Goldberg | |
| 2,780,309 A | 2/1957 | Loftheim | |
| 4,279,743 A | 7/1981 | Miller | |
| 6,110,246 A | 8/2000 | Eubank | |
| 7,249,468 B2 | 7/2007 | Roston | |
| 7,749,310 B2 | 7/2010 | Lagerstedt et al. | |
| 8,353,665 B1 | 1/2013 | Stockstill et al. | |
| 2003/0085158 A1 | 5/2003 | Oirschot | |
| 2003/0221996 A1 | 12/2003 | Svoronos et al. | |
| 2008/0308480 A1 | 12/2008 | Lagerstedt et al. | |
| 2012/0010063 A1 | 1/2012 | Levitt et al. | |

OTHER PUBLICATIONS

Extended European Search Report for European Application 14861087.6 and PCT/US2014/064660, dated May 29, 2017, 10 pages.

* cited by examiner

AIR OR GAS CLEANING BLOWER WITH SPIRAL SEPARATION CHAMBER

CLAIM OF BENEFIT TO RELATED APPLICATIONS

This application claims the benefit of U.S. provisional patent application 62/398,450 entitled "Air or Gas Cleaning Blower" filed on Sep. 22, 2016. The contents of application 62/398,450 are hereby incorporated by reference.

TECHNICAL FIELD

The present invention relates to a filtration apparatus that separates and ejects particulates from air or gas.

BACKGROUND ART

In many industrial, commercial, institutional and residential applications, machinery and facilities are subjected to environmental hazards and harsh operating conditions that expedite or otherwise induce mechanical failure or sub-optimal operation of the equipment, overheating, discomfort or unhealthy conditions for people and animals, and many other unwanted effects. Air or gas that is pervaded with particulates is one such hazard. The particulates can include coal dust, saw dust, metal dust, road dust, dirt, sand, pollen, and liquid contaminants as some examples. When the air and the accompanying particulates enter into the equipment, the particulates can disrupt or interfere with the normal operation of equipment, and thus cause its failure or sub-optimal operation. Similarly, when the particulates enter closed or controlled environments or systems, such as hospitals, electrical cabinets, homes, communications equipment, vehicles, and many other facilities, the particulates can create failure or safety issues. In other words, the particulates can also be harmful to humans breathing in the particulate-pervaded air.

Air or gas cleaning systems have existed for many years. Some operate with permeable barriers that entrap the unwanted particulates while permitting the cleansed air or gas to pass through. They inherently create an initial pressure drop, creating a restriction to the airflow, which worsens over time as the media entraps the unwanted particles, further reducing performance, increasing the consumption of energy, and causing wear and tear on blowers and other machine components. Moreover, these air or gas cleaning systems are expensive to operate and to maintain as the barrier entrapping the particulates must be continually cleaned or replaced. Other systems operate by manipulating airflow in various ways to induce the separation of the particulates from the air. The vast majority of these separation systems have an intrinsic downfall in that the particulates must be collected, emptied, and disposed of. Thus, there remains a need for improved filtration systems that more effectively supply clean air or gas from a source of particulate-pervaded air or gas while doing so more reliably, economically, and effectively for prolonged periods in industrial and other applications without the necessity that the particulate be collected and, often, without the need of a separate blower or other air-moving device.

BRIEF DESCRIPTION OF THE DRAWINGS

In order to achieve a better understanding of the nature of the present invention, a preferred embodiment for an air or gas cleaning blower with a spiral separation chamber will now be described, by way of example only, with reference to the accompanying drawings in which.

DETAILED DESCRIPTION

In the following detailed description, numerous details, examples, and embodiments for the air or gas cleaning blower with the spiral separation chamber are set forth and described. It will be clear and apparent to one skilled in the art that the blower is not limited to the embodiments set forth and that the blower may be practiced without some of the specific details and examples discussed.

Provided is an air or gas cleaning blower with a spiral separation chamber that removes particulates from air or gas. The particulates can include any solid-state matter that is intermixed with the air or gas resulting in an undesired contamination of the air or gas. Coal dust, saw dust, metal dust, dirt, and sand are some examples of particulates that the blower removes from air or gas. The particulates can additionally or alternatively include liquids suspended in the air or gas.

Figure 1:
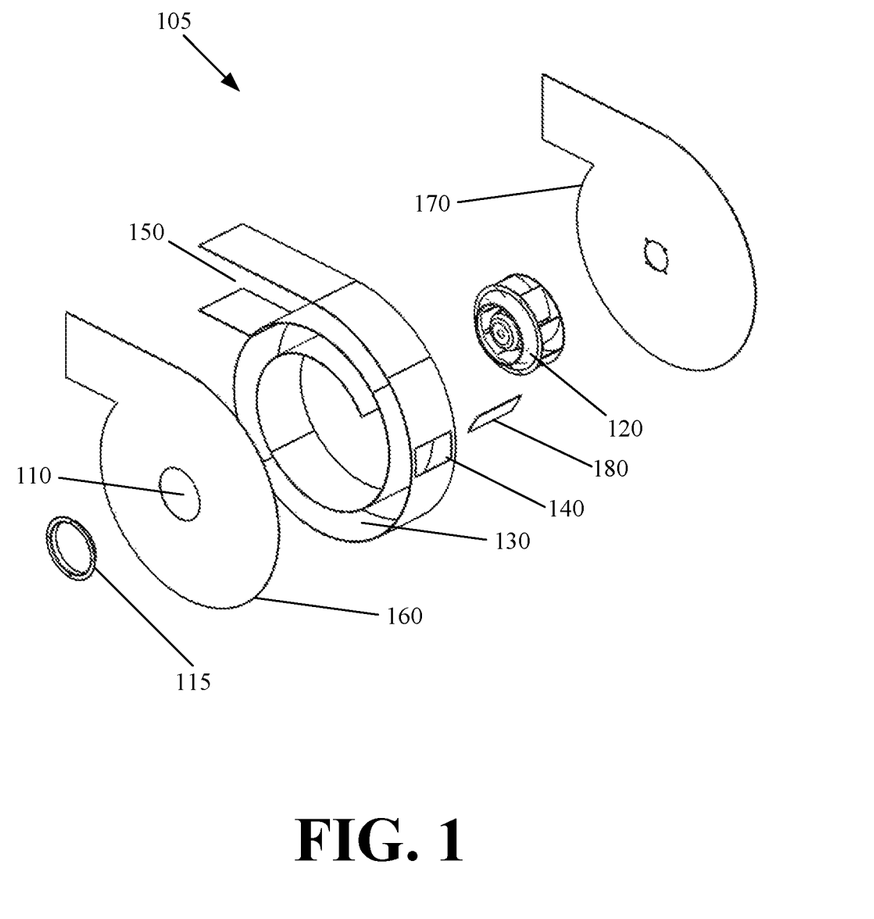
FIG. 1 provides an exploded view of the blower in accordance with some embodiments.

FIG. 1 provides an exploded view of the blower 105 in accordance with some embodiments. The blower 105 comprises an intake 110, with or without inlet ring 115, a powered impeller 120, a spiral chamber 130, a particulate outlet 140, cleaned air or gas outlet 150, front wall 160, and back wall 170. The size of these components 110-170 will vary depending on the application of the blower and a desired amount of air flow to be cleaned.

Figure 2:
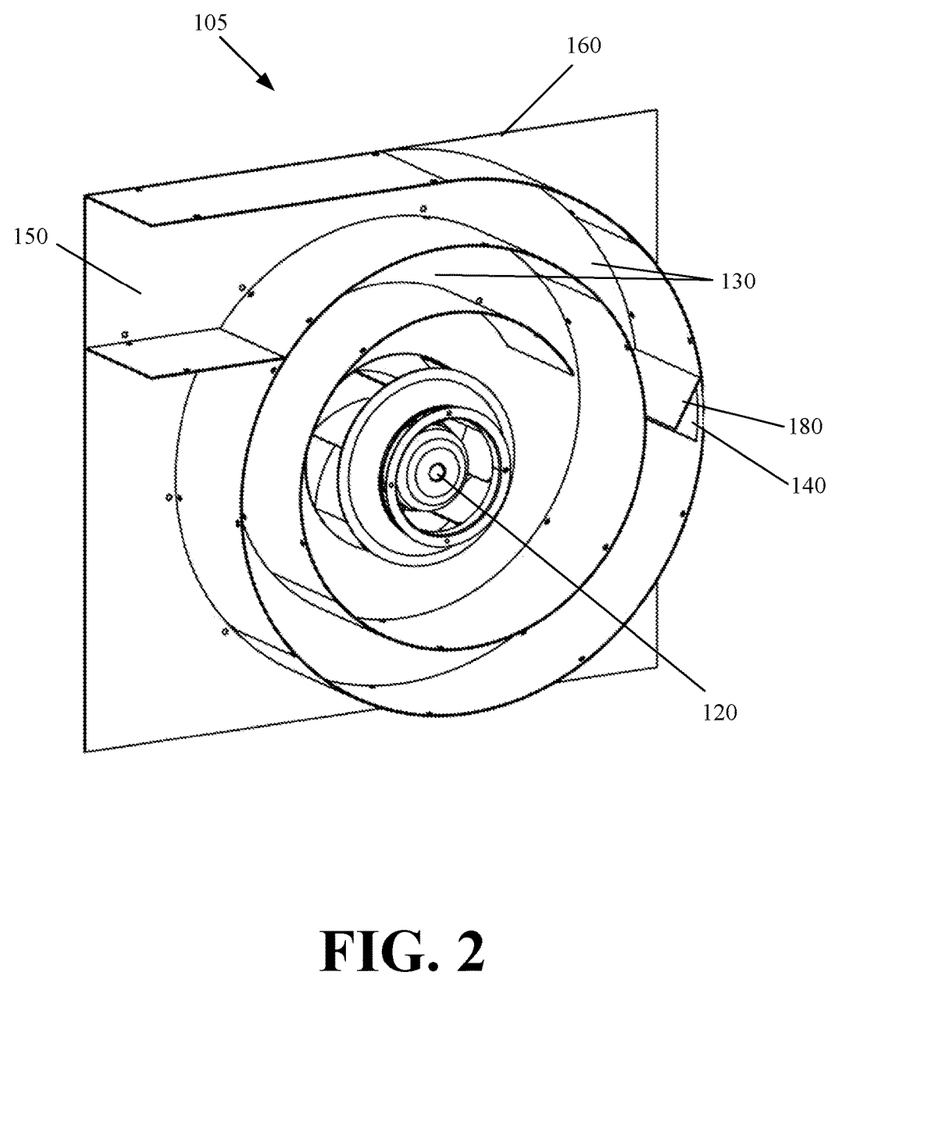
FIG. 2 provides a partial cutaway perspective internal view of the blower in accordance with some embodiments.
Figure 3:
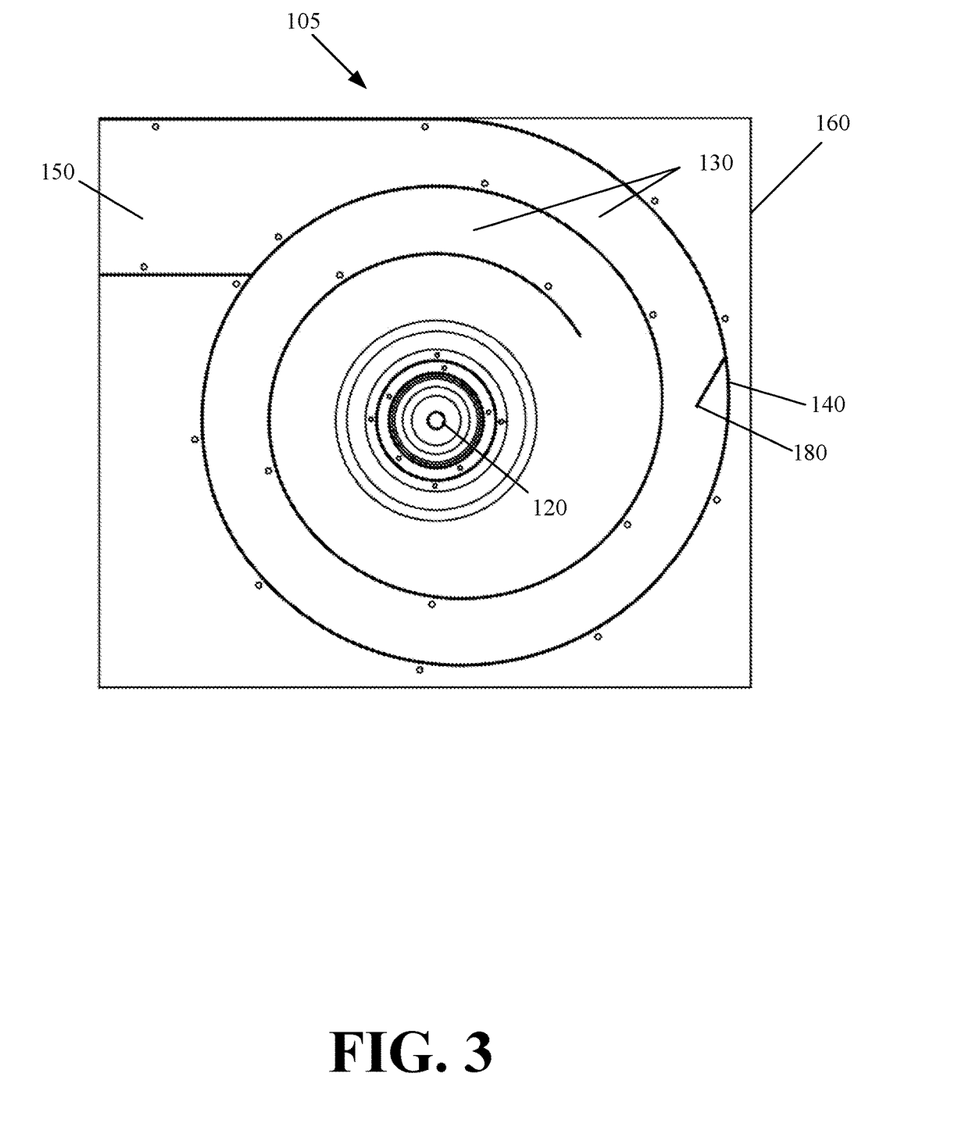
FIG. 3 provides a partial cutaway side internal view of the blower in accordance with some embodiments.
Figure 4:
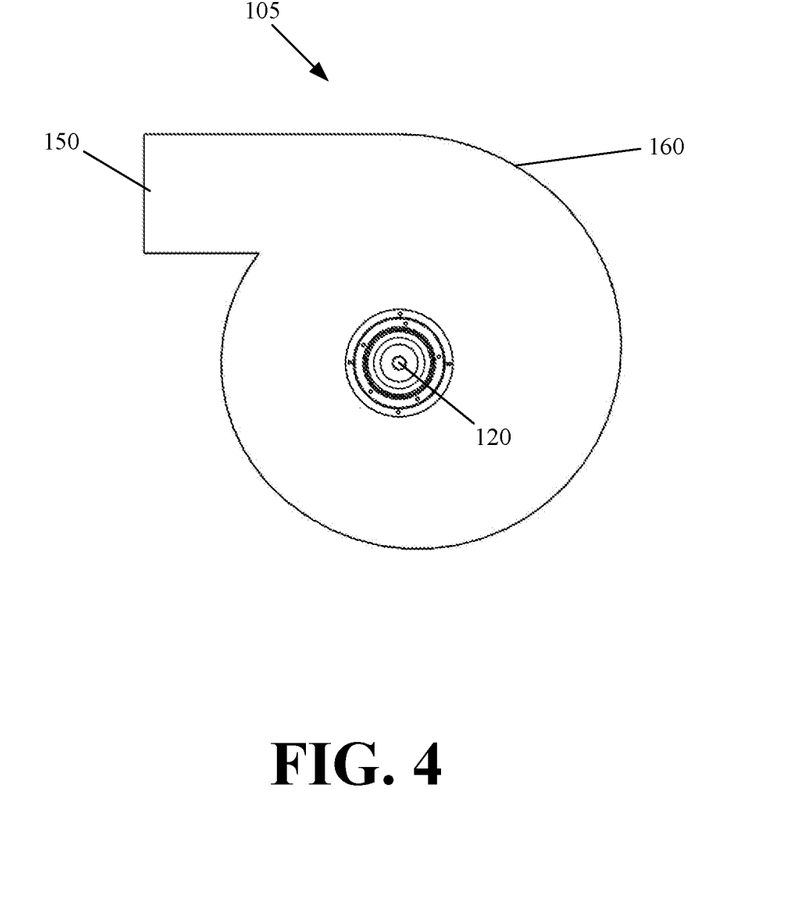
FIG. 4 provides a front view of the blower in accordance with some embodiments
Figure 5:
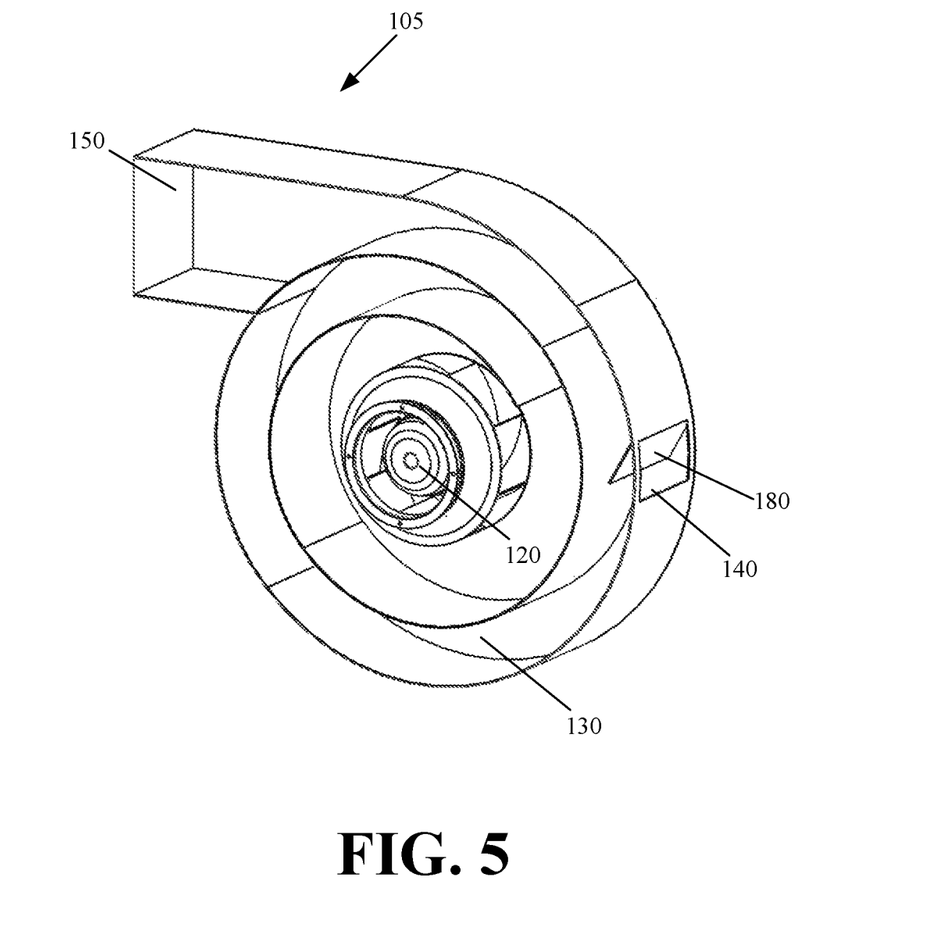
FIGS. 5 and 6 provide partial cutaway alternative angle perspective internal views of the blower in accordance with some embodiments.
Figure 6:
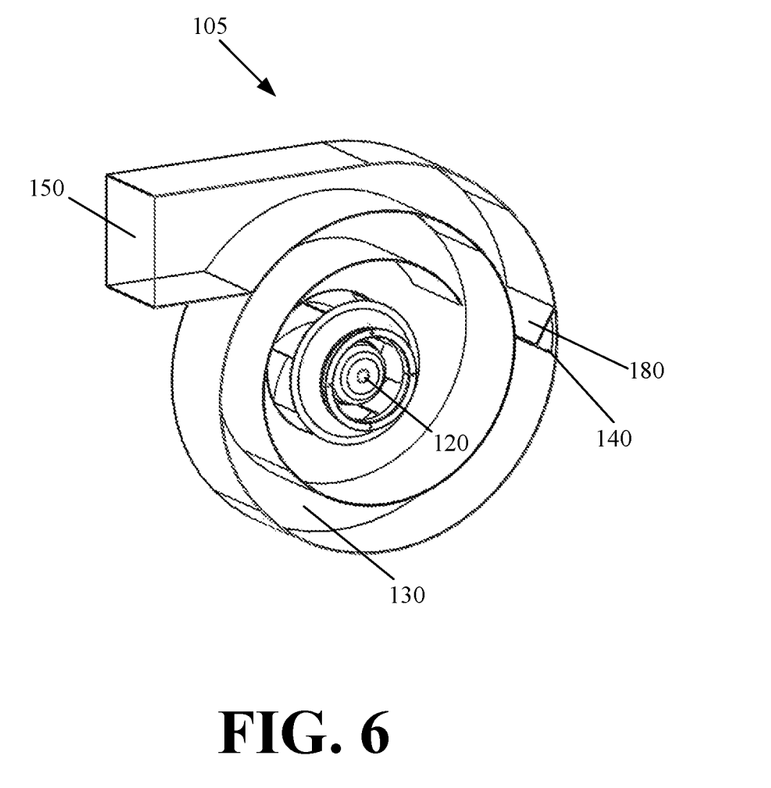

Additional views of the blower 105 as well as its components are presented in FIGS. 2-6. Specifically, FIG. 2 provides a partial cutaway perspective internal view of the blower 105 in accordance with some embodiments; FIG. 3 provides a partial cutaway side internal view of the blower 105 in accordance with some embodiments; FIG. 4 provides a front view of the blower 105 in accordance with some embodiments; and FIGS. 5 and 6 provide partial cutaway alternative angle perspective internal views of the blower 105 in accordance with some embodiments.

The intake 110 is an opening about the blower front wall 160 through which the blower intakes particulate-pervaded air or gas into the spiral chamber 130. In some embodiments, the inlet ring 115 is an insert that fits over or is coupled to the opening of the intake 110 about the blower front wall 160. The intake 110 is located at the center of the spiral chamber 130.

In preferred embodiments, the inlet ring 115 is circular in shape to coincide with the shape of the intake 110 and the powered impeller 120 mode of operation. In some other embodiments, the inlet ring 115 provides a shape adapter that is conical or any other regular or irregular shape for coupling to the intake 110. The various shapes of the inlet ring 115 allow the intake 110 to couple to standard and non-standard ducts of varying sizes and thus funnel particulate-pervaded air or gas from different machines into the spiral chamber 130.

The inlet ring 115 is an optional component for some embodiments of the blower 105. The intake 110 can be left exposed in order to intake air or gas from the surrounding environment. The intake 110 can be constructed of any rigid or supported material such as steel, aluminum, sheet metal, plastic, etc. The diameter of the intake 110 and, optionally, the diameter of the inlet ring 115 vary depending on the application of the blower 105. Accordingly, the intake 110 and, optionally, the inlet ring 115 can have a diameter less than an inch for cleaning small volumes of air or gas to far larger diameters (e.g., several meters) for cleaning large volumes of air or gas.

In some embodiments, the powered impeller 120 is attached to a mount about the inward face of the blower back wall 170. The mount can include a set of openings, a solid plate, or a set of supports. The mount can be a fixed or detachable structure of the blower. In other words, the mount can be molded or welded to the blower back wall 170 or coupled to the blower back wall 170 with removable hardware. Nuts and bolts, screws, or other type of fasteners inserted in the back of the impeller 120 and through the mount retain the impeller 120 position within the blower 105. Some embodiments rely on an adhesive to mount and retain the impeller 120 position within the blower 105.

The mount position about the blower back wall 170 is aligned with the intake 110 or inlet ring 115 position about the blower front wall 160. The mount positions the impeller 120 about centrally within the blower 105, and more specifically, centrally within the spiral chamber 130. Moreover, the impeller mount is separated from the blower 105 front wall 160 with a distance about equal to the depth of the impeller 120. In some embodiments, the blower 105 front wall 160 includes a gasket or lip that fits onto and creates a seal with the inlet ring 115.

The impeller 120 comprises several blades that rotate about an axis on which the impeller 120 inlet is located. In some embodiments, the motor powering the impeller 120 is located directly on the impeller 120. Power is provided to the impeller 120 motor by wiring that runs from the impeller 120 motor out the blower 105 back, side, or front. In some other embodiments, the impeller 120 motor can be located away from the rotating blades. For instance, the impeller 120 is mounted on a pillow block rotated by a belt. In some embodiments, the impeller blades are mounted on a shaft that originates at the motor, at a gear box, or at another point which can support and/or power the impeller 120.

In response to powering on the impeller 120, the blades of the impeller 120 rotate within the blower 105. The rotation generates a suction force at the impeller 120 inlet. The suction force draws the particulate-pervaded air or gas from the outer face of the intake 110 in through the impeller 120. The rotation further accelerates the particulate-pervaded air or gas outwards from the center of rotation, away from the blades, and into the center of the blower spiral chamber 130. In doing so, the impeller 120 rotation generates a centrifugal force within the spiral chamber 130.

The spiral chamber 130 is a channel that continuously winds or curves around the center where the impeller 120 is disposed. The channel can curve one or more times around the spiral chamber 130 center. Here again, the dimensions of the channel depend on the application of the blower 105 and also the flow rate of the impeller 120. The channel can be wider and higher for a larger or faster rotating impeller 120 and narrower and smaller for a smaller or slower rotating impeller 120. Similarly, the length of the channel and the curvature of the spiral can vary based on the flow rate produced by the impeller, the blower application, and/or the flow rate and pressure desired at the point of discharge.

In some embodiments, the spiral chamber 130 is formed from a solid or rigid material such as steel, aluminum, hardened plastic, or other metals. The spiral chamber 130 may be welded, bolted, or otherwise coupled to the blower 105 front and back walls 160 and 170, wherein the blower 105 front and back walls 160 and 170 are coverings comprised of metal or other rigid material. In any configuration, there is no gap between the spiral chamber 130 channel walls and the blower 105 front and back walls 160 and 170 so that air or gas drawn into the spiral chamber 130 moves in a single direction out and around the spiral chamber 130.

In some other embodiments, the spiral chamber 130 is a tube, hose, or other continuous conduit formed in a spiral shape with one end opening or connected to intake 110 or inlet ring 115 and the opposite end opening or connected to the cleaned air or gas outlet 150 with one or more additional openings for the particulate outlet 140. In some such embodiments, the spiral chamber 130 can be adhered to the blower 105 front and back walls 160 and 170.

In some embodiments, the dimensions of the spiral chamber channel remain constant as the channel spirals around and away from the spiral chamber 130 center. In some other embodiments, the dimensions of the channel decrease or increase the further the channel extends away from the spiral chamber 130 center. The decrease in channel size can be used to increase pressure the farther the particulate-pervaded air or gas is pushed through the channel and away from the impeller 120 at the center of the spiral chamber 130. The increase can be used to the opposite effect.

Pressure builds within the spiral chamber 130 as more of the particulate-pervaded air or gas is drawn in by the impeller 120. The building pressure forces the particulate-pervaded air or gas into the spiral chamber 130 channel and away from the spiral chamber 130 center. In particular, the acceleration of the particulate-pervaded air or gas away from the impeller 120 caused by the impeller 120 rotation creates the centrifugal force within the spiral chamber 130. The centrifugal force accelerates the particulate-pervaded air or gas outwards and away from the center of the spiral chamber 130. This force pushing the particulate-pervaded air or gas through the spiral chamber channel along with the difference in mass between the particulates or liquids suspended in the air or gas and the air or gas itself causes the particulates or liquids to separate from the air or gas and run along the inside of the outer wall of the spiral chamber 130 channel, wherein the outer wall is one of the two walls of the channel that is furthest from the center.

Figure 7:
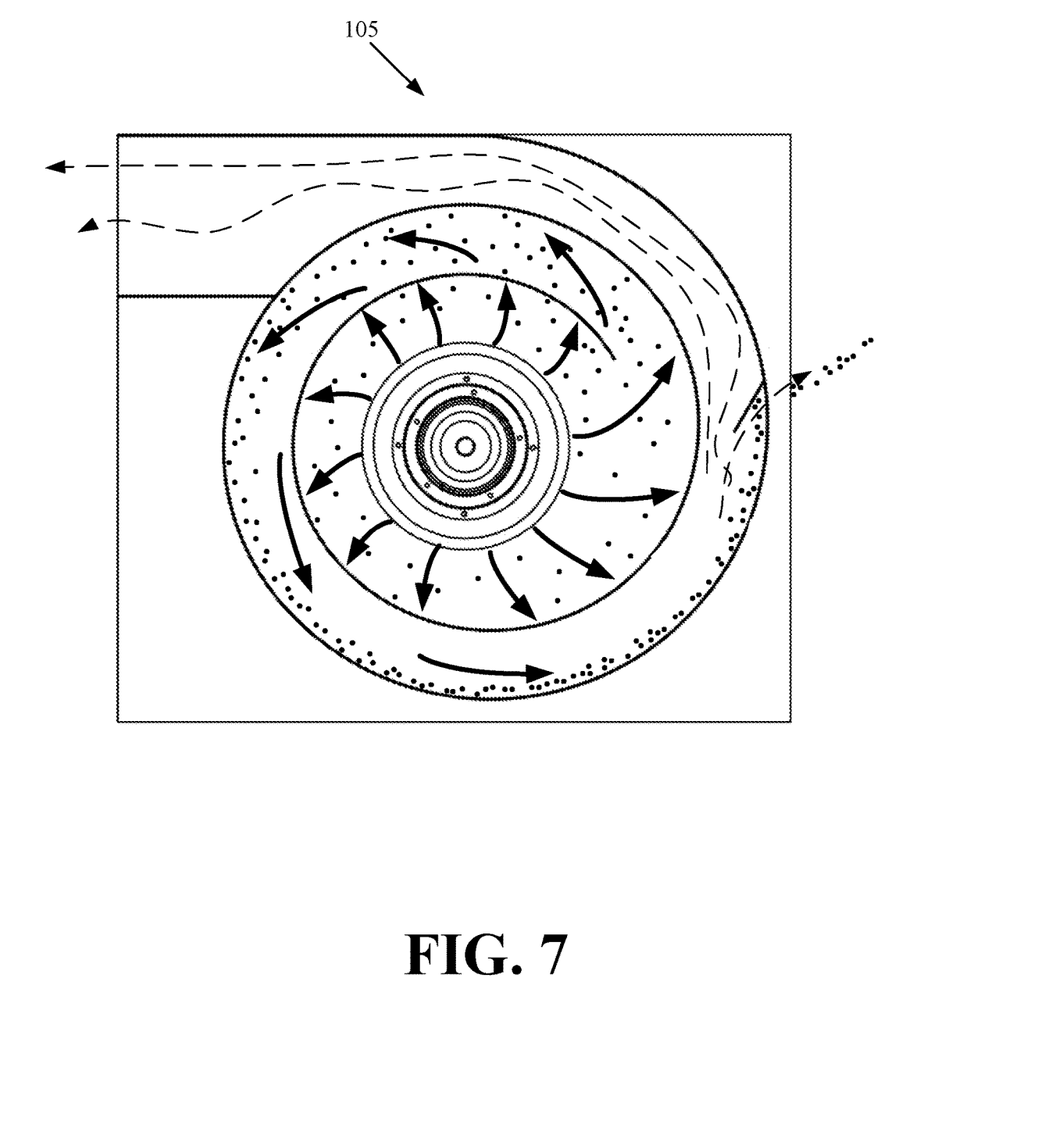
FIG. 7 illustrates the separation of the particulates from the air or gas within the spiral chamber of the blower in accordance with some embodiments.

The separation of the particulates or liquids from the air or gas within the spiral chamber 130 of the blower 105 of some embodiments is depicted in FIG. 7. As shown, the rotation of the impeller 120 accelerates the particulate-pervaded air or gas outwards and imposes the centrifugal force to push the particulate-pervaded air or gas against the inside of the outer wall of the spiral chamber channel. The particulates, because of their heavier mass relative to the air or gas in which the particulates are suspended, accumulate against the inside of the outer wall of the channel. Most of the lighter air or gas is unable to penetrate through the layer of particulates. Consequently, the particulates separate from the air or gas with the heavier particulates and liquids being trapped against the outer channel wall and with most of the lighter air or gas being trapped in between the particulates about the outer wall and the inner wall of the spiral chamber 130. The continued rotation of the impeller 120 maintains the force, pressure, and airflow that keep the particulates separated from the air or gas and that push the particulates and air or gas through the spiral chamber 130.

The particulate outlet 140 is located about the final curve of the spiral chamber 130, wherein the final curve forms in part one or more of the blower 105 bottom, side, or top in some embodiments. In other words, there are no additional curves of the spiral chamber 130 separating the particulate outlet 140 from an exterior side of the blower 105. The particulate outlet 140 can be located about any of the bottom, side, or top of the blower 105 in different embodiments. FIG. 1 illustrates the particulate outlet 140 at a side of the blower 105 that is opposite to the side at which the cleaned air or gas outlet 150 is located.

The particulate outlet 140 comprises an opening and an optional deflector 180. The opening is located about the outer wall of the spiral chamber 130 channel that is about an externally exposed side of the blower 105. The opening leads directly out of the blower 105.

The deflector 180 is a piece of metal or another rigid surface. The deflector 180 extends from the spiral chamber 130 wall with the particulate outlet 140 opening at a distal end of the particulate outlet 140 opening, wherein the distal end of the particulate outlet 140 is the furthest end of the opening from the spiral chamber 130 center. The deflector 180 extends inwards towards the inner wall of the spiral chamber 130 and a proximal end of the particulate outlet 140 opening. In other words, the deflector 180 extends into the spiral chamber 130 channel in the opposite direction with which the particulates and air or gas are pushed through the spiral chamber 130. In some embodiments, the deflector 180 extends inwards at an acute angle from the particulate outlet 140 opening. It is important to note that the deflector 180 does not extend the full height, width, and depth of the spiral chamber 130 channel. There is some gap between the deflector 180 proximal end (i.e., the end extending into the channel) and one or more sides of the channel. In preferred embodiments, the deflector 180 is connected to the outer wall and the side walls of the spiral chamber 130, but does not extend the full length to connect to the inner wall of the spiral chamber 130. The length of the deflector 180 can serve in modulating the airflow. For instance, airflow increases as the deflector 180 extends more from the spiral chamber 130 outer wall towards the inner wall. Accordingly, some embodiments provide blowers 105 with different length deflectors or a blower with an adjustable length deflector 180.

The deflector 180 aids in ejecting the particulates that have accumulated against the outer wall of the spiral chamber 130 channel. Specifically, the deflector 180 interrupts the path about the outer wall of the spiral chamber 130 channel. The deflector 180 stops the particulates from traveling further down the outer wall of the spiral chamber 130 channel and instead redirects the particulates out the particulate outlet 140 opening with the aid of the force and pressure exerted by continued rotation of the impeller 120 at the center of the spiral chamber 130.

The majority of the cleaned air or gas flows around the deflector 180 and continues traveling down the spiral chamber 130 channel until reaching the cleaned air or gas outlet 150 where the cleaned air of gas is ejected out from the blower 105. In some embodiments, the cleaned air or gas outlet 150 is an opening located about the end of the spiral chamber 130. The cleaned air or gas outlet 150 can open out the blower back wall 170. Alternatively, the cleaned air or gas outlet 150 can open out the blower front wall 160 or side between the blower front wall 160 and back wall 170 at the end of the spiral chamber 130. A funnel or duct can be coupled to the cleaned air or gas outlet 150 to redirect the air flow in a desired direction or to change the airflow rate and/or pressure. In some embodiments, the size of the cleaned air or gas outlet 150 is modified relative to the impeller 120 flow and/or desired exit pressure and noise level. In some embodiments, a filter medium or other post-filter is placed over or attached to the cleaned air or gas outlet 150 to remove any particulates that moved past the particulate outlet 140.

FIG. 7 further illustrates the separate ejection of the particulates out the particular outlet 140 and the cleaned air or gas out the cleaned air or gas outlet 150. In particular, the particulates pushed against the spiral chamber 130 outer wall by the impeller 120 induced centrifugal force flow out the particulate outlet 140 located about the outer wall with redirection and trapping of the deflector 180. Meanwhile, a majority of the cleaned air or gas traveling between the layer of particulates and the spiral chamber 130 inner wall moves around the deflector 180 and continues through the spiral chamber 130 until ejection at the cleaned air or gas outlet 150.

Figure 8:
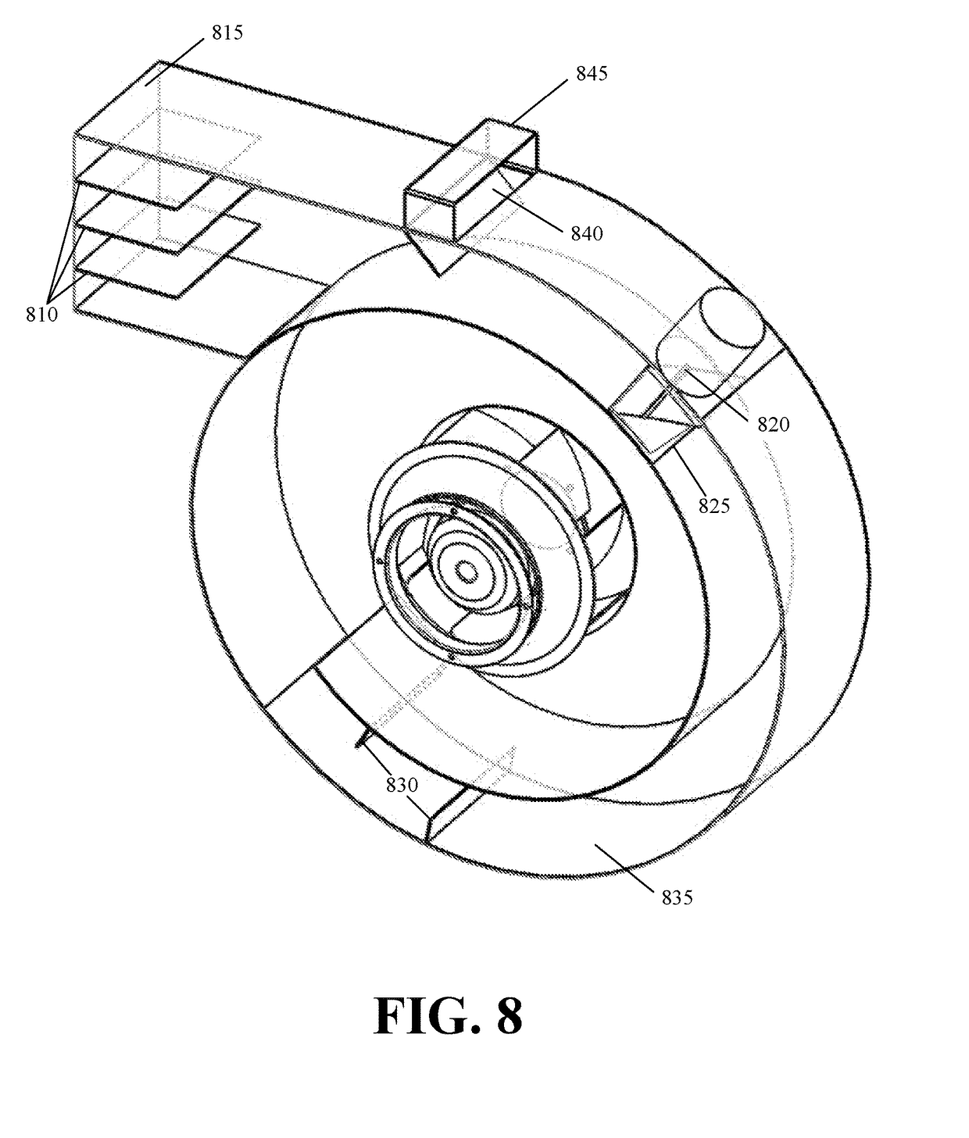
FIG. 8 illustrates the blower of some embodiments with a set of exit baffles near the cleaned air or gas outlet, an adjustable flap at the particulate outlet, internal baffles within the spiral chamber channel.

Some embodiments provide one or more flaps, baffles, other deflectors, or attachments to adjust, modify, or regulate the flow within the spiral chamber 130 channel, out the particulate outlet 140, and out the cleaned air or gas outlet 150. FIG. 8 illustrates the blower of some embodiments with a set of exit baffles 810 near the cleaned air or gas outlet 815, one or more adjustable flaps 820 at the particulate outlet 825, and internal baffles 830 within the spiral chamber 835 channel.

The set of exit baffles 810 regulate the flow of air or gas out of the cleaned air or gas outlet 815. The set of baffles can be affixed within or without the spiral chamber channel to "straighten" or otherwise modify the flow of the air or gas and its turbulence as it exits the blower.

In some embodiments, the set of exit baffles 810 is mounted to a flexible hinge or as a louver with a control lever. The angle of the set of exit baffles 810 can be adjusted by manipulating the control lever. The control lever moves the flexible hinge or louver which in turn adjusts the vertical positions of the set of exit baffles 810. Manipulation of the control lever allows a user to change the direction of the cleaned air or gas exiting the blower and also enlarge or reduce the size of the cleaned air or gas outlet 815, thereby controlling the air or gas flow rate and pressure leaving the blower at the cleaned air or gas outlet 815.

In some embodiments, the control lever is mechanically operated by linkage to an actuator. The user can remotely control the position of the set of exit baffles 810 by remotely activating the actuator. The actuator can be a manual, pneumatic, hydraulic, magnetic, or electrical force or motor linked to the control lever or directly to the moveable hinge or baffles.

The one or more adjustable flaps 820 provide control similar to that from the set of exit baffles 810 at the particulate outlet 825. More specifically, the one or more adjustable flaps 820 opens and closes the particulate outlet 825 and also changes the direction and/or location at which the particulates exit the blower. The one or more adjustable flaps 820 are rectangular, flat, or other-shaped surfaces that rotate about a shaft that is connected to a rotational or other type of control on the outside of the blower. The one or more adjustable flaps 820 are positioned adjacent to or coupled to the particular outlet 825. The rotational control changes the orientation of the one or more adjustable flaps 820, thereby modifying and regulating the flow out the particulate outlet 825. As with the set of exit baffles 810, the one or more adjustable flaps 820 can be manually or automatically operated. Automatic operation involves linking the one or more adjustable flaps 820 to a pneumatic, hydraulic, magnetic, or electrical actuator that can be remotely controlled.

Figure 9:
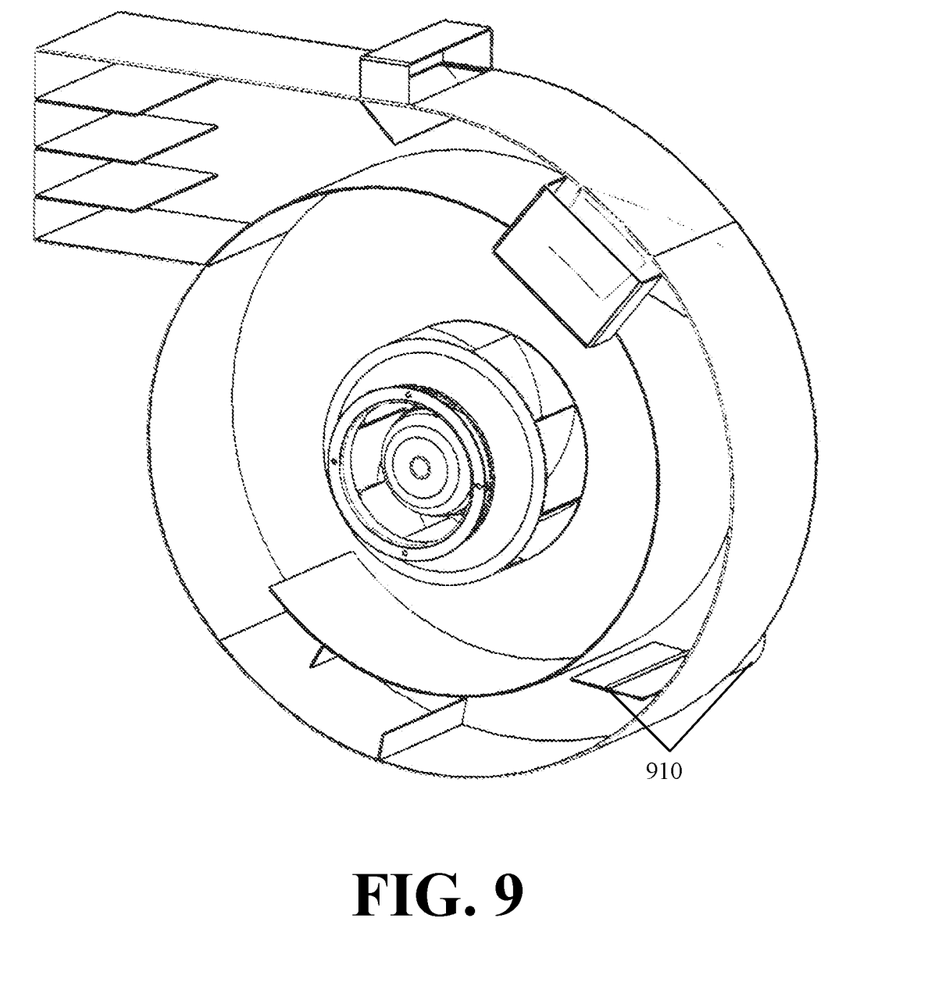
FIG. 9 illustrates one or more of the internal baffles that can be mounted on a flexible hinge or on pins that is/are linked to an external lever for positional adjustments in accordance with some embodiments.

The internal baffles 830 can be mounted to the inner walls, outer walls, or side walls of the spiral chamber 835 channel at various positions within the length of the spiral chamber. The internal baffles 830 affect the flow within the blower and can be used to speed or slow the flow depending on their placement, create additional pressure against the spiral chamber 835 channel's outer wall by redirecting more of the air or gas against the outer wall, create additional pressure against the spiral chamber 835 channel's inner wall, or create partial blockages or obstacles that reduce the rate of flow past the internal baffles 830. The position and orientation of the internal baffles 830 can be fixed or adjustable. As shown in FIG. 9, one or more of the internal baffles 910 can be mounted on a flexible hinge or on pins that is/are linked to an external lever for manual positional adjustments or to an actuator for automatic positional adjustments.

It should be noted that the blower can include zero or more of the set of exit baffles 810, adjustable flaps 820, and/or internal baffles 830 and that each included component can be fixed, manually adjustable, or automatically adjustable as described above. To further adjust or modify the flow rate and pressure, some embodiments optionally introduce one or more openings about the spiral chamber 835 channel. For instance, FIG. 8 includes the additional external opening 840. The external opening 840 can be used to control the rate of airflow or the discharge pressure at the final discharge. Other external openings can be used to inject air into the spiral chamber 835 with the injected air cooling or warming the impeller drawn air, thereby modifying the pressure within the spiral chamber 835, while internal openings can be used to redirect air between different spirals or layers of the spiral chamber 835 to recirculate air or gas for further separation of particulates or for further modification to speed or flow.

Attachments can be provided for coupling to any of the blower's exterior openings. The attachments can be used to redirect any of the openings in a different direction or orientation. FIG. 8 further illustrates an attachment 845 that is coupled to an external opening which faces up from the blower. The attachment 845 redirects the flow exiting from the opening to a side of the blower that is opposite to the cleaned air or gas outlet 815. The attachment 845 can also serve as an adapter for coupling the blower and its various openings to hoses, ducts, and other accessories. Although shown with a rectangular shape in FIG. 8, the attachment 845 can have any regular or irregular shape and different shapes at either end to couple to the blower openings as well as different hoses, ducts, and other accessories.

Figure 10:
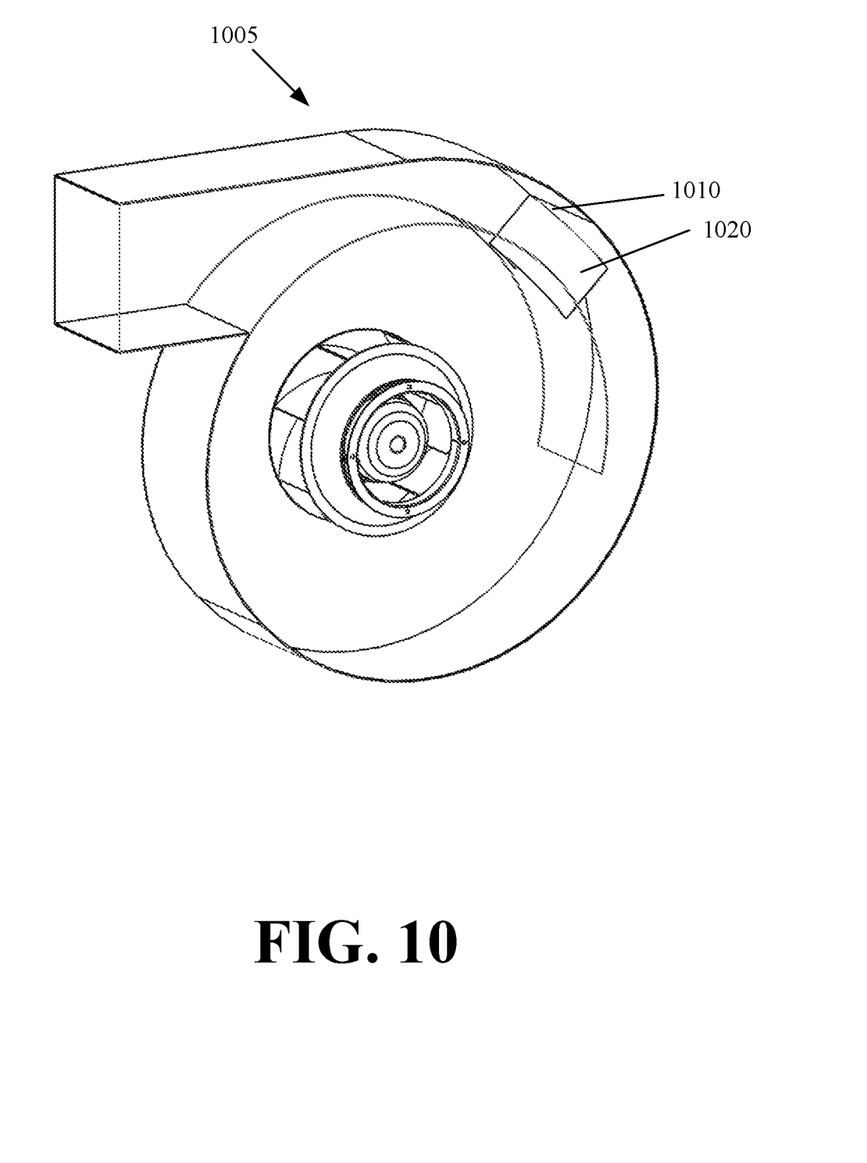
FIGS. 10 and 11 provide different perspective views for an alternative blower implementation in accordance with some embodiments.
Figure 11:
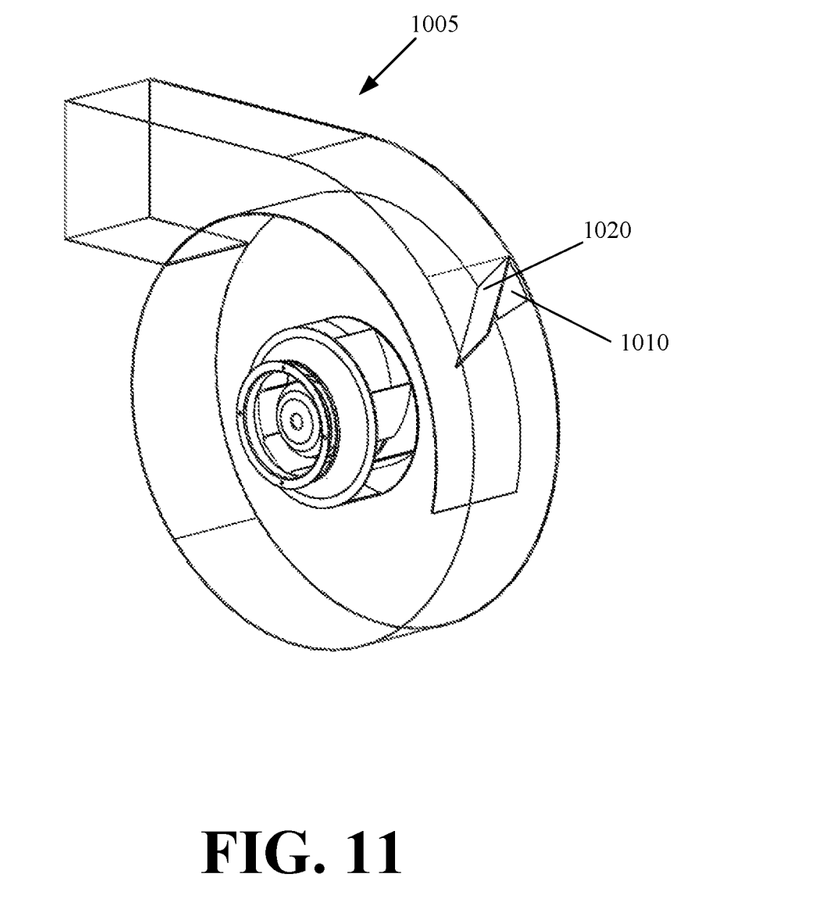

FIGS. 10 and 11 provide different perspective views for an alternative blower 1005 implementation in accordance with some embodiments. The alternative blower 1005 reduces the length of the spiral chamber channel. More specifically, the number of spiral rotations is reduced. Also, the particulate outlet 1010 opening is located about the blower front wall. As the front wall is aligned with the blower intake, the particulate outlet 1010 of the alternative blower 1005 ejects the particulates back into the environment with the particulate-pervaded air or gas. The deflector 1020 position is also modified to extend from the blower front wall at an acute angle to the blower back wall.

We claim:

1. An air or gas cleaning apparatus comprising:
  a spiral chamber comprising an inner wall and an outer wall that form a continuous channel continuously spiraling one or more rotations about a center, wherein the inner wall is closest to said center and the outer wall is furthest from said center;
  a powered impeller disposed centrally within the spiral chamber, the powered impeller generating a suction force drawing in particulate-pervaded or liquid-pervaded air or gas into the center of the spiral chamber and further generating a centrifugal force accelerating the particulate-pervaded or liquid-pervaded air or gas against the outer wall of the spiral chamber and through the spiral chamber;
  a particulate outlet located about an outermost and final rotation of the outer wall of the spiral chamber, the particulate outlet ejecting out of the apparatus, particulates separating from the particulate-pervaded or liquid-pervaded air or gas and accumulating against the outer wall as a result of the centrifugal force and a heavier mass of the particulates relative to the air or gas of the particulate-pervaded or liquid-pervaded air or gas; and
  a cleaned air or gas outlet located further downstream in the spiral chamber from the particulate outlet, the cleaned air or gas outlet ejecting the air or gas separated from the particulates and flowing between the inner wall and the outer wall of the spiral chamber.

2. The apparatus of claim 1, wherein the cleaned air or gas outlet is located towards an end of the spiral chamber furthest from the center of the spiral chamber.

3. The apparatus of claim 2, wherein the cleaned air or gas outlet comprises a straight extension with an opening protruding from the end of the spiral chamber.

4. The apparatus of claim 1, wherein the powered impeller comprises an inlet and a plurality of blades rotating about an axis of the inlet.

5. The apparatus of claim 1 further comprising (i) a front wall with an intake and (ii) a back wall, wherein said intake is coupled to the powered impeller, wherein the front wall seals a front side of the spiral chamber and prevents the particulate-pervaded or liquid-pervaded air or gas from escaping the spiral chamber about said front side, and wherein the back wall seals an opposite back side of the spiral chamber and prevents said particulate-pervaded or liquid-pervaded air or gas from escaping the spiral chamber about the back side.

6. The apparatus of claim 5 further comprising a mount affixed to the back wall, said mount coupling to the impeller and aligning the impeller with at least one of the intake of the front wall or a shaft to which the powered impeller is mounted.

7. The apparatus of claim 1, wherein the particulate outlet comprises an opening from the spiral chamber to the apparatus exterior, wherein said opening of the particulate outlet is disposed on a front, side, or back of the apparatus.

8. The apparatus of claim 7, wherein the particulate outlet further comprises a deflector, the deflector extending from a distal end of said opening inwards from the outer wall of the spiral chamber into the spiral chamber towards a proximal end of said opening, wherein the distal end is a side of the opening furthest from the center of the spiral chamber and the proximal end is a side of the opening closest to the center of the spiral chamber.

9. The apparatus of claim 1 further comprising an adjustable flap adjacent to the particulate outlet, the adjustable flap regulating flow out of the particulate outlet by opening and closing said particulate outlet.

10. The apparatus of claim 1 further comprising one or more adjustable baffles adjacent to the cleaned air or gas outlet, the one or more adjustable baffles modifying air or gas flow and turbulence out of the cleaned air or gas outlet by opening, closing, and redirecting said flow at or before the cleaned air or gas outlet.

11. The apparatus of claim 1, wherein the spiral chamber further comprises one or more baffles extending from at least one of the inner wall, side wall, or the outer wall, said one or more baffles altering flow of the particulate-pervaded or liquid-pervaded air or gas within the spiral chamber.

12. An air or gas cleaning blower comprising:
a front wall with an intake opening;
a back wall;
a spiral chamber sealed by the front wall on one side and the back wall on an opposite side, the spiral chamber comprising (i) a center aligned with the intake opening and (ii) a continuous channel curving around said center with one or more rotations;
a powered impeller disposed in the center of the spiral chamber, said powered impeller comprising an inlet coupled to the intake of the front wall through which particulate-pervaded air or gas is drawn into the spiral chamber;
a first outlet comprising (i) an opening about an outer wall of the continuous channel through which particulates separated from the particulate-pervaded air or gas are ejected from the blower, and (ii) a deflector extending inwards into the spiral chamber from a downstream end of the opening of the first outlet towards a near end of the opening of the first outlet, wherein the near end is closer to the spiral chamber center than the far end; and
a second outlet located further down the spiral chamber from the first outlet, the second outlet comprising an opening through which cleaned air or gas separated from the particulate-pervaded air or gas is ejected from the blower.

13. The blower of claim 12, wherein the back wall comprises a mount coupling to a back side of the powered impeller and retaining a position of the powered impeller within said blower.

14. The blower of claim 12, wherein the powered impeller further comprises (i) a plurality of blades rotating in a same direction as the continuous channel of the spiral chamber, and (ii) a motor powering rotation of the plurality of blades, wherein the motor is adjacent to the plurality of blades.

15. The blower of claim 12, wherein the opening of the first outlet is located about the front side of the blower with the intake, wherein the first outlet ejects the particulates into a same environment from which the particulate-pervaded air or gas is drawn.

16. An air or gas cleaning blower comprising:
a front wall with an intake opening;
a back wall;
a spiral chamber sealed by the front wall on one side and the back wall on an opposite side, the spiral chamber comprising (i) a center aligned with the intake opening and (ii) a continuous channel curving around said center with one or more rotations;
a powered impeller disposed in the center of the spiral chamber, said powered impeller comprising an inlet coupled to the intake of the front wall through which particulate-pervaded air or gas is drawn into the spiral chamber;
a first outlet comprising an opening located about a front side of the blower with the intake opening, and further located about an outer wall of the continuous channel through which particulates separated from the particulate-pervaded air or gas are ejected from the blower into a same environment from which the particulate-pervaded air or gas is drawn; and
a second outlet located further down the spiral chamber from the first outlet, the second outlet comprising an opening through which cleaned air or gas separated from the particulate-pervaded air or gas is ejected from the blower.

17. An air or gas cleaning apparatus comprising:
a spiral chamber comprising an inner wall and an outer wall continuously spiraling about a center, wherein the inner wall is closest to said center and the outer wall is furthest from said center;
a powered impeller disposed centrally within the spiral chamber, the powered impeller generating a suction force drawing in particulate-pervaded or liquid-pervaded air or gas into the center of the spiral chamber and further generating a centrifugal force accelerating the particulate-pervaded or liquid-pervaded air or gas against the outer wall of the spiral chamber and through the spiral chamber;
a particulate outlet comprising (i) an opening from the spiral chamber to an exterior of the apparatus, with the opening located about the outer wall of the spiral chamber and disposed on a front, side, or back of the apparatus, and (ii) a deflector extending from a distal end of said opening inwards from the outer wall of the spiral chamber into the spiral chamber towards a proximal end of said opening, wherein the distal end is a side of the opening furthest downstream from the center of the spiral chamber and the proximal end is a side of the opening closest to the center of the spiral chamber, the particulate outlet ejecting out of the apparatus, particulates separating from the particulate-pervaded or liquid-pervaded air or gas and accumulating against the outer wall as a result of the centrifugal force and a heavier mass of the particulates relative to the air or gas of the particulate-pervaded or liquid-pervaded air or gas; and
a cleaned air or gas outlet located further downstream in the spiral chamber from the particulate outlet, the cleaned air or gas outlet ejecting the air or gas separated from the particulates and flowing between the inner wall and the outer wall of the spiral chamber.

18. An air or gas cleaning apparatus comprising:
a spiral chamber comprising an inner wall and an outer wall continuously spiraling about a center, wherein the inner wall is closest to said center and the outer wall is furthest from said center;
a powered impeller disposed centrally within the spiral chamber, the powered impeller generating a suction force drawing in particulate-pervaded or liquid-pervaded air or gas into the center of the spiral chamber and further generating a centrifugal force accelerating the particulate-pervaded or liquid-pervaded air or gas against the outer wall of the spiral chamber and through the spiral chamber;

a particulate outlet located about the outer wall of the spiral chamber, the particulate outlet ejecting out of the apparatus, particulates separating from the particulate-pervaded or liquid-pervaded air or gas and accumulating against the outer wall as a result of the centrifugal force and a heavier mass of the particulates relative to the air or gas of the particulate-pervaded or liquid-pervaded air or gas;

an adjustable flap adjacent to the particulate outlet, the adjustable flap regulating flow out of the particulate outlet by opening and closing the particulate outlet; and a cleaned air or gas outlet located further downstream in the spiral chamber from the particulate outlet, the cleaned air or gas outlet ejecting the air or gas separated from the particulates and flowing between the inner wall and the outer wall of the spiral chamber.

19. An air or gas cleaning apparatus comprising:

a spiral chamber comprising an inner wall and an outer wall continuously spiraling about a center, wherein the inner wall is closest to said center and the outer wall is furthest from said center;

a powered impeller disposed centrally within the spiral chamber, the powered impeller generating a suction force drawing in particulate-pervaded or liquid-pervaded air or gas into the center of the spiral chamber and further generating a centrifugal force accelerating the particulate-pervaded or liquid-pervaded air or gas against the outer wall of the spiral chamber and through the spiral chamber;

a particulate outlet located about the outer wall of the spiral chamber, the particulate outlet ejecting out of the apparatus, particulates separating from the particulate-pervaded or liquid-pervaded air or gas and accumulating against the outer wall as a result of the centrifugal force and a heavier mass of the particulates relative to the air or gas of the particulate-pervaded or liquid-pervaded air or gas;

a cleaned air or gas outlet located further downstream in the spiral chamber from the particulate outlet, the cleaned air or gas outlet ejecting the air or gas separated from the particulates and flowing between the inner wall and the outer wall of the spiral chamber; and one or more adjustable baffles adjacent to the cleaned air or gas outlet, the one or more adjustable baffles modifying air or gas flow and turbulence out of the cleaned air or gas outlet by opening, closing, or redirecting said flow at or before the cleaned air or gas outlet.

20. An air or gas cleaning apparatus comprising:

a spiral chamber comprising (i) an inner wall and an outer wall continuously spiraling about a center, and (ii) one or more baffles extending from at least one of the inner wall, a side wall, or the outer wall, said one or more baffles altering flow of particulate-pervaded or liquid-pervaded air or gas within the spiral chamber, wherein the inner wall is closest to said center and the outer wall is furthest from said center;

a powered impeller disposed centrally within the spiral chamber, the powered impeller generating a suction force drawing in the particulate-pervaded or liquid-pervaded air or gas into the center of the spiral chamber and further generating a centrifugal force accelerating the particulate-pervaded or liquid-pervaded air or gas against the outer wall of the spiral chamber and through the spiral chamber;

a particulate outlet located about the outer wall of the spiral chamber, the particulate outlet ejecting out of the apparatus, particulates separating from the particulate-pervaded or liquid-pervaded air or gas and accumulating against the outer wall as a result of the centrifugal force and a heavier mass of the particulates relative to the air or gas of the particulate-pervaded or liquid-pervaded air or gas; and a cleaned air or gas outlet located further downstream in the spiral chamber from the particulate outlet, the cleaned air or gas outlet ejecting the air or gas separated from the particulates and flowing between the inner wall and the outer wall of the spiral chamber.

\* \* \* \* \*